United States Patent
Woelfel (10) Patent No.: US 6,998,001 B2
(45) Date of Patent: Feb. 14, 2006

(54) VEHICLE WHEEL ASSEMBLY AND RELATED METHOD THEREFOR

(75) Inventor: James A. Woelfel, Holt, MI (US)

(73) Assignee: Lacks Industries, Inc., Grands Rapids, MI (US)

(*) Notice: Subject to any disclaimer, the term of this patent is extended or adjusted under 35 U.S.C. 154(b) by 0 days.

(21) Appl. No.: 10/760,835

(22) Filed: Jan. 20, 2004

(65) Prior Publication Data

US 2004/0169413 A1 Sep. 2, 2004

Related U.S. Application Data

(62) Division of application No. 09/879,533, filed on Jun. 12, 2001, now Pat. No. 6,729,695.

(51) Int. Cl.
*B60B 7/06* (2006.01)

(52) U.S. Cl. .................... 156/78; 301/37.11; 301/37.43
(58) Field of Classification Search ............ 301/37.101, 301/37.102, 37.11, 37.43; 156/78, 79
See application file for complete search history.

(56) References Cited

U.S. PATENT DOCUMENTS

| | | | | |
|---|---|---|---|---|
| 3,669,501 A | * | 6/1972 | Derleth | 301/37.42 |
| 3,726,566 A | * | 4/1973 | Beith | 301/37.11 |
| 5,368,370 A | * | 11/1994 | Beam | 301/37.36 |
| 5,595,423 A | * | 1/1997 | Heck et al. | 301/37.43 |
| 5,664,845 A | * | 9/1997 | Maloney et al. | 301/37.43 |
| 6,082,829 A | * | 7/2000 | Chase | 301/37.43 |

OTHER PUBLICATIONS

Pages taken from Fomo Products, Inc. website for Handi-Foam adhesive products. Product information, uses, and FAQ, no date.*

Handi-Foam material data sheet, FOMO Products, Inc. issued May 1994.*

* cited by examiner

*Primary Examiner*—Russell D. Stormer
(74) *Attorney, Agent, or Firm*—VanOphem & VanOphem, P.C.

(57) ABSTRACT

An apparatus and method for constructing a wheel assembly by adhesively bonding a wheel cover to a wheel using a bead of foamed-in-place adhesive. As the wheel and wheel cover are assembled together, the bead of foamed-in-place adhesive is compressed between the wheel cover and the wheel, and thereby spreads out therebetween. The method results in a more complete volumetric fill of adhesive between the wheel cover and wheel, and results in a faster cure time of adhesive when compared to the prior art, thereby enabling a reduction in manufacturing cycle time and work-in-process inventory.

15 Claims, 5 Drawing Sheets

VEHICLE WHEEL ASSEMBLY AND RELATED METHOD THEREFOR

CROSS-REFERENCES TO RELATED APPLICATIONS

This application is a division of Ser. No. 09/879,533, filed Jun. 12, 2001 now U.S. Pat. No. 6,729,695.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to wheels that are equipped with a decorative wheel cover. More specifically, this invention relates to an apparatus and related method for adhesively securing a wheel cover to a wheel in a manner that results in a more economical, yet complete volumetric fill of adhesive therebetween to enhance sound deadening characteristics, and that results in a faster cure time of the adhesive and cycle time of the assembly process when compared to the prior art.

2. Description of the Related Art

Various methods for adhesively attaching two components together to make an assembly have been well known for a long time. More specifically, many types of decorative wheel covers are widely known to be adhesively attached to an underlying wheel to economically enhance the aesthetic appearance of many different types of automobile wheels. A classic example of a vehicle wheel construction having an adhesively attached wheel cover is U.S. Pat. No. 3,669,501 to Derleth.

Derleth discloses an annular-shaped overlay composed of a thin plastic cover formed from acrylonitrile-butadiene-styrene (ABS) mounted to a wheel spider. The overlay is configured to have variations in contours in a direction transverse to the axis of the wheel which exceed the variations in the rim and/or disc contour of the wheel, which variations would be extremely difficult and expensive, if not impossible, to stamp or draw in the disc of the wheel. During assembly, an adhesive foamable polyurethane is coated on the wheel, and the cover is then quickly clamped to the wheel before the polyurethane begins to foam. As such, the void between the wheel and cover is filled with the polyurethane foam, and any excess polyurethane foam formed around the bolt holes or at the periphery of the assembly must be trimmed. Thus, the polyurethane foam serves to permanently adhere the cover to the wheel.

Derleth teaches that the polyurethane foam adhesive provides a low-density, semi-resilient reinforcement for the thin gauge plastic cover while also providing sound insulation for tire and wind noise. However, it is understood by those skilled in the art that another reason for spacing the overlay's cover from the wheel surface is to avoid the deleterious effects of heat generated by the wheel and brake, which would otherwise distort the plastic cover and delaminate any surface treatment, i.e. paint, plating, etc., applied thereto. Further, the polyurethane foam adhesive completely breaks down at high temperatures experienced under certain actual road conditions. This is particularly true in the immediate region of the wheel hub where temperatures tend to be much higher than in the remainder of the wheel. While the polyurethane foam adhesive taught by Derleth has an insulating effect, the thermal barrier provided by the foam adhesive is inferior to air. Also, the manner in which the foam adhesive is formed in situ on the wheel does not readily permit limiting the degree to which the foam adhesive fills the cavity.

One obvious shortcoming of the process disclosed by Derleth is that the composite wheel must be imperforate, except for the small bolt openings necessary for attaching the wheel to a vehicle. It is understood by those skilled in the art that it is necessary to avoid the deleterious effects of heat generated by the wheel and brake that cause the ABS plastic overlay to distort, cause delamination of any surface treatment, i.e. paint, plating, etc., and further cause the foam adhesive to degrade, distort and eventually melt. Further problems with urethane formed wheels surfaced in use. These wheels were very heavy due to the high density of the foam and variation in localized density during the manufacturing phase resulted in severe wheel imbalances and costly assemblies.

Turbine openings are a necessary element in today's wheel systems in providing proper cooling to the brake system, not to mention the aesthetics of endless configurations of turbine openings that add individuality and style to a vehicle. Any opening in the wheel or overlay using the process disclosed in Derleth is a pathway for the foam mixture to escape when it begins to foam and/or cure. Larger openings, such as turbine openings, would not be possible using the Derleth process without additional structure to seal the openings to prevent the foaming material from escaping. Therefore, a drawback of the process according to Derleth is that excess foam mixture is required to ensure that the cavity between the cover and the wheel is completely filled after the material vents out through the bolt openings. The process disclosed by Derleth requires any substantial opening in the wheel be plugged or sealed with a sleeve to prevent foam leakage. For example, if the wheel hub was left unsealed it would provide a path for some of the foam to escape, and the security of the cover could be jeopardized. Further, all of the excess foam must be manually removed, which adds significant labor cost to the process.

The method according to Derleth has been known since the early 1970's and due to its many disadvantages has yet to realize practical applications and commercial success. The process cannot accommodate the application temperature requirements, the need for lighter weight components, and degradation of the urethane adhesive over time, as well as the need for turbine openings in the outboard face of the wheel. Further, the process is extremely costly due to the labor intensive trimming operations, difficult process control, and potential environmental, health and safety concerns.

Another example of an adhesively attached wheel cover is taught in U.S. Pat. No. 4,416,926 to Maglio which discloses adhering a wheel cover to a wheel with a resin matrix containing hollow microspheres to form a structural syntactic foam and reduce the density of the resin to result in a lightweight product. Similar to the teachings of Derleth, the wheel cover taught by Maglio is also axially spaced away from the wheel to avoid the wheel's potentially high temperatures, particularly near the center of the wheel. Unfortunately, however, the Maglio disclosure does not at all teach one skilled in the art how to introduce the hollow microspheres into the resin to achieve the syntactic foam. Furthermore, Maglio does not teach a process, or at what point in the process, wherein the microspheres are introduced and what effect the microspheres have on the fill volume or cure rate of the foam.

U.S. Pat. No. 5,753,747 to Oien, however, does teach just such a process. Oien teaches a method of using a hot-melt adhesive containing a particulate filler to fill cavities in a substrate wherein the particulate filler improves the cure time of the adhesive. Oien discloses a method of mixing, among many other ingredients, the hot-melt adhesive with a quantity of hollow inorganic microspheres to form a cellular hot-melt adhesive composition. Again, it is submitted that such a process is unnecessarily complicated as evidenced by the many required chemical components and the lengthy and intricate recipe disclosed in Oien. Furthermore, use of hot-melt adhesive is generally not acceptable for use with a wheel assembly near the hub of the wheel, where braking heat can easily destroy the adhesive properties thereof.

U.S. Pat. No. 5,188,428 to Carter, III teaches a decorative wheel having a unique wheel cover retention system for attaching to an ordinary underlying automotive wheel in a manner that more closely duplicates the appearance of a custom wheel. Carter, III discloses a specially configured plastic wheel cover that includes a deeply contoured body portion and a narrow outer rim portion. The retention system is disposed between the wheel cover and the wheel and includes two mating rings arranged concentrically, the first of which attaches to the back of the wheel cover, the second of which secures to the automotive wheel. The second ring is permanently attached to the automotive wheel with an adhesive that bonds the second ring to an annular wall of the wheel in a manner that provides a secure bond between the dissimilar materials. The adhesive is a one-part silicone rubber adhesive that sets at room temperature but does not harden and, thus, remains elastic and flexible.

A further example of bonding an overlay to a wheel is taught by Beam in U.S. Pat. Nos. 5,368,370 and 5,461,779. Beam teaches an ornamental appliqué formed on a uniform thickness of stainless steel sheet stock that requires attachment to the wheel by the use of a full surface curable adhesive uniformly deposited between the stainless steel cover and a mechanical locking arrangement. The mechanical locking arrangement consists of an undercut in the rim of the wheel into which the cover nests and a hole in the wheel aligned with a hole in the applique wherein a lug stud is permanently attached to create a mechanical lock that, according to Beam's teachings, compresses the full surface uniform layer of curable adhesive to hold the applique in place until the adhesive cures.

Beam's teachings present several problems. The mating of the stainless steel and the steel wheel at the rim area results in a galvanic action occurring that visibly is unacceptable in the marketplace. Further, at the hub portion of the wheel, the high temperatures experienced under certain driving or testing conditions may detrimentally affect the full surface uniform layer of curable adhesive while the cost of using a full surface curable adhesive is prohibitively expensive and wasteful since there is no need for a full surface uniform layer of adhesive to hold the overlay to the wheel. Further, a full surface uniform layer of curable adhesive also detrimentally affects the balancing considerations of the wheel and overlay assembly.

To avoid some of the problems of Beam, U.S. Pat. No. 5,597,213 to Chase, assigned to the assignee hereof, teaches the use of an intermediate positive fixing element for temporarily positioning and securing an overlay to a wheel during an interval in which a selectively positioned or applied adhesive required to permanently adhere the overlay to the wheel is allowed to cure. A temporary hot melt adhesive is combined with the use of a high strength, slow-curing adhesive, both of which are selectively placed between the overlay and the wheel to alleviate concerns of squeaks and rattles as well as to improve the overall manufacturability, performance and consumer-perceived quality of the resulting wheel assembly. The hot melt adhesive is capable of creating a bond almost instantly, but is ill suited for securing the overlay to the outboard surface of the wheel over its service life, that is, once the wheel is installed and in use on an automobile. Therefore, the hot-melt adhesive is characterized as being suitable only for temporarily securing the overlay to the outboard surface of the wheel during the assembly of the overlay and wheel and while the high strength, slow-curing adhesive is curing. Advantageously, such use comes during a critical period when the overlay is susceptible to movement relative to the wheel. Accordingly, while the hot melt adhesive is not suitable for permanently securing the overlay to the wheel, the hot melt adhesive is readily capable of positively maintaining the position of the overlay on the outboard surface of the wheel during the period in which the high strength, slow curing adhesive is curing.

Chase discloses selectively depositing the adhesive beads in parallel, but separated lines of adhesive rather than a solid layer to create voids so as to reduce the amount of curing time of the adhesive and thereby reduce manufacturing time and costs. As such, air between the lines of adhesives is captured between the overlay and the wheel to assist in curing the adhesive. Further curing for certain adhesives is significantly reduced by exposure to moisture laden air. In such cases high humidity air is introduced into the assembly process and the technique of selective application of the adhesive can be utilized to establish voids between lines of adhesive that serve to entrap moisture laden air further enhancing cure times and reducing overall costs of the manufacturing process. The requirement of an intermediate positive fixing element, or temporary adhesive, not only adds costs and complexity to the overlay but requires careful handling and special packaging, all adding to the overall cost of the wheel assembly. Additionally, the need to use redundant beads of adhesive adds to process time, material cost, and weight of the wheel assembly.

Similarly, U.S. Pat. No. 5,845,973 to Chase is a continuation of the Chase '213 method and apparatus. Chase '973 is a method for compensating for axial tolerance variations defining a gap between an overlay and a wheel. The dimension of the gap varies according to hi-lo conditions of various axial dimensions of each of the overlay and the wheel. Therefore, sufficient adhesive is placed between the overlay and the wheel to accommodate these variations in the gap. Since the gap is said to vary as much as 0.25 inches, it is preferred that a foam adhesive is used at the center of the wheel to minimize excessive squeeze out of the adhesive. Unfortunately, however, structural foam adhesives, such as disclosed in Derleth and Chase, are relatively expensive compared to sealant bead alternatives such as silicone RTV, and also present costly processing techniques in order to seal the assembly so that the expanding foam does not squeeze out and create a mess.

U.S. Pat. No. 5,636,906 to Chase, also owned by the assignee hereof, teaches a decorative overlay to enhance the aesthetic appearance of an automotive wheel. The overlay described in the preferred embodiment is a metal-plated plastic panel that is adhesively attached to the outboard surface of the wheel disc and may radially extend to the flange lip of the rim flange so as to cover the outboard surface in the rim flange area of the wheel. The overlay provides a pleasing aesthetic effect to the wheel. The overlay covers most of the wheel's outboard surface but does not extend radially outward to cover the edge or flange lip of the rim flange of the wheel. The base material composition and metal plating of the overlay permit the exterior surface of the overlay to be closely contoured to the outboard surface of the wheel, namely, the disc of the wheel and a major portion or all of the rim flange of the wheel. Further, the overlay resists delamination of the metal plating due to heat.

Maloney et al., U.S. Pat. No. 5,435,631, is directed to the problems associated with the retention of wheel covers to a wheel. Maloney et al. teach a wheel cover retention system, wherein the outboard tire bead seat retaining flange or rim flange of the wheel includes a groove as taught in Beam for securing the wheel cover to the wheel. Maloney et al. further teach that an outboard tire bead seat retaining flange of a wheel includes a unique construction for securing the wheel cover to the wheel. The outboard tire bead seat retaining flange includes an outer surface having a circumferential, radially inwardly facing groove formed therein. A relatively thin wheel cover having an outer annular lip extends into the groove in the outboard surface of the wheel. The groove functions, in part, to hide a peripheral edge of the cover. With respect to the method used for assembling the cover to the wheel, Maloney et al. is completely devoid of any specific teaching with respect to the relationship of the cover relative to the outboard surface of the wheel with the exception that the outer annular lip extends into the groove. Other than this specific teaching, Maloney et al. teach that the wheel cover is preferably formed from stainless steel and is prefabricated to generally match the particular configuration of the outboard facing surface of the disc.

Maloney et al. disclose that an adhesive, such as a two-part epoxy, is used to permanently secure the wheel cover to the wheel. The adhesive is preferably applied on the outboard face of the wheel disc in a predetermined pattern consisting of an inner circle, an outer circle, and angled radial lines. Such a pattern is selected so that when the wheel cover is installed on the wheel disc, a smearing of the adhesive occurs over substantially the entire outboard face of the wheel disc.

Unfortunately, the patterns of adhesive as disclosed in the Chase patents and Maloney et al. have several well known drawbacks. First, such high-strength adhesives are costly, take an exceedingly long time to cure, and may require application of heat to cure properly. The adhesive usually takes at least 24 hours to cure sufficiently before the wheel assembly can be shipped without possibility of wheel cover separation during transit or at the assembly plant. Any reduction in this initial cure time is desirable to reduce the turnaround time in supplying an assembly plant with finished wheel assemblies, and thereby reduce the amount of work-in-process (WIP) and inventory costs related thereto. Since wheels must be available to the wheel cover manufacturer for producing the finished wheel assemblies, the wheel cover manufacturer's process is reliant upon the continuous availability of wheels from the wheel manufacturer. From time to time a shortage of wheels occurs, thus causing a shortage of finished wheel assemblies available to the assembly plant. As the supply of wheels from the wheel manufacturer becomes restored, the pressure to quickly supply finished wheel assemblies to the vehicle assembly plant is enormous. It is therefore desirable to reduce the throughput time in converting the wheels and wheel covers into sufficiently cured finished wheel assemblies. Currently, the excessive 24 hour cure time has too much potential to result in a temporary line shutdown at a customer assembly plant. Additionally, the excessively long initial cure time unfortunately necessitates temporary securing features, adhesives, or slave tools.

Second, use of such high-strength adhesives ordinarily results in a substantial air gap in multiple areas between the wheel cover and wheel. The existence of such an air gap has generated a concern among wheel engineers relating to the sound deadening abilities of the adhesive between the wheel and the wheel cover. Since automobile wheels experience harsh environments during their useful life, it has often been the practice of wheel engineers to rap on the wheel cover attached to the wheel to gauge the "soundness" of the wheel assembly. Unfortunately, however, the inclusion of the air gap between the wheel cover and the wheel tends to yield a relatively loud and undesirable hollow sound when rapped upon.

Finally, application of such high-strength adhesives usually results in a relatively thin bead that is often inadequate to fill the gap between the wheel cover and wheel in certain areas and thereby necessitates a close relationship therebetween. Accordingly, if a wheel designer wishes to space the wheel cover inboard surface a greater distance from the wheel outboard surface, a structural foam adhesive needs to be used instead of the bead of sealant or adhesive.

Methods, systems, and articles involving applying beads of sealant or adhesive have been well known for quite some time. For example, U.S. Pat. No. 4,059,714 to Scholl teaches a method of bonding using a hot melt thermoplastic adhesive foam. Unlike the adhesive foam described in Derleth and Chase, the adhesive foam of Scholl is akin to a thermoplastic paste that is foamed by mixing an inert gas therewith to produce the foam. While the adhesive is in a liquid state the adhesive/gas mixture is pressurized to force the gas into solution with the adhesive. When the pressurized adhesive/gas mixture is dispensed from a nozzle at atmospheric pressure, the gas comes out of solution and becomes entrapped within the adhesive to form a closed cell hot-melt adhesive foam.

Similarly, U.S. Pat. No. 5,382,397 to Turner, Jr. teaches a method of applying a closed cell foam seal to an automotive body seam. Turner, Jr. discloses the method having the following steps: supplying a polymeric sealant of thermoplastic, thermoset, or plastisol composition; mixing the sealant with an inert gas; pressurizing the sealant and gas mixture to drive the gas into solution within the sealant; maintaining the gas in solution within the sealant; dispensing the sealant/gas mixture in the form of a foamed bead into an automobile body seam; controlling the foamed bead to a desired width and amount; and curing the foamed bead to seal the automobile body against intrusion of moisture, dust, and noise.

Finally, methods for applying foamed-in-place gaskets have been generally well known. For example, U.S. Pat. No. 4,834,824 to Tiedeck teaches a method of forming a foamed-in-place gasket for a workpiece to be mounted on a support member, wherein a continuous sealant bead is applied upon a coated release board and transferred to the workpiece. Similarly, U.S. Pat. No. 5,324,470 to Comert et al. teaches a method of forming a gasket in place on a surface of a pipe flange from a non-foamed bead of a moisture curable material. Unfortunately, none of the last four prior art references described above identify the peculiar problems associated with securing a wheel cover to a wheel, nor do they suggest any particular solutions thereto.

From the above, it can be appreciated that adhesive attachment systems of the prior art are not fully optimized to solve the peculiar problems of effectively attaching a wheel cover to a wheel for use in a harsh environment for the life of the vehicle. Therefore, what is needed is an improved method of securing a wheel cover to a wheel that is economical to produce, requires significantly less cure time of a bead of adhesive used therein, and that more effectively and efficiently fills the gap between the wheel and wheel cover so as to provide improved sound deadening characteristics over a conventional bead of adhesive.

SUMMARY OF THE INVENTION

According to a preferred embodiment of the present invention there is provided a wheel assembly construction and a related method for assembling a wheel cover to automotive cast and fabricated wheels. The present invention is an improvement over prior art wheel covers of the type that are adhesively attached to an outboard surface of the wheel. In particular, wheel covers suitable for use in this invention are preferably composed of a high impact, high heat resistant solid plastic panel member that is adhesively attached to the outboard surface of the wheel with a gas-impregnated bead of adhesive. Generally, such wheel covers are adapted to be secured to the wheel's outboard surface, defined by a wheel disc and a rim flange circumscribing the disc. As used herein, the outboard surface of the wheel is that surface of the wheel intended to be positioned on the laterally outward side of a vehicle and which, without the wheel cover, would be visible to an observer.

In one aspect, the present invention includes a wheel assembly having a wheel with an outboard surface thereon, a wheel cover having an inboard surface thereon that mounts to the outboard surface of the wheel, and a gap established therebetween. Additionally, a bead adhesive that has been injected with a gas to form a closed-cell foamed adhesive is disposed between the wheel cover and wheel, and thereby occupies a predetermined volumetric portion of the gap. The bead of closed-cell foamed adhesive is composed of a high density paste adhesive that serves as a liquid phase and an inert gas that serves as a gas phase in the form of a plurality of gas bubbles entrapped within the liquid phase. In other words, the bead of closed-cell foamed adhesive is similar in many ways to a bead of whipped cream or shaving cream dispensed from a canister. Before now, however, such a bead of closed-cell foamed adhesive has not been applied to a wheel assembly construction for permanently securing a wheel cover to a wheel in a manner that significantly reduces hollow-sounding noise, cure time of an adhesive, cycle time of the wheel assembly process, and costs to produce a wheel assembly by making more efficient use of an adhesive.

In another aspect, the present invention includes a method of assembling the wheel cover to the wheel to form the wheel assembly. The method involves providing the wheel having the outboard surface thereon, and providing the wheel cover having the inboard surface facing the outboard surface of the wheel. The method further involves dispensing the bead of closed-cell foamed adhesive to one or both of the inboard and outboard surfaces of the wheel cover and wheel and, finally, assembling the wheel cover to the wheel such that the inboard surface of the wheel cover faces the outboard surface of the wheel, wherein the gap is defined therebetween. Accordingly, the bead of closed-cell foamed adhesive is compressed between the wheel cover and the wheel to spread the bead of closed-cell foamed adhesive therebetween, thus forming a permanent bond and establishing voids between the wheel cover and the wheel.

Thus, the present invention solves several of the general problems identified above in the prior art. First, the need to use relatively expensive prior art structural foam adhesives, such as in Derleth, etc., to secure wheel covers to wheels is eliminated by the present invention. Second, the need to use redundant parallel beads of unfoamed adhesive to provide sufficient coverage and a reasonable cure time, such as in Chase and Maloney, is also eliminated by the present invention. Third, the present invention provides certain advantages associated with a structural foam adhesive with certain advantages of an applied bead of unfoamed adhesive, like more complete filling of the gap and faster cure time and process cycle time, and ease of bead application and less material required. Before now, the advantages of using the structural foam adhesive and the bead of unfoamed adhesive were thought to be mutually exclusive. Additionally, the present invention solves several specific problems in the prior art as described in the following objectives of the apparatus and method of the present invention.

It is an object to provide a wheel cover for a wheel in which the wheel cover is formed separately from the wheel and therefore must be assembled to the wheel with an adhesive.

It is another object to provide a method for permanently bonding a wheel cover to a wheel with a bead of closed-cell foamed adhesive that mitigates the need to provide a temporary securing element, such as mechanical interlocking features, a separate fast-cure adhesive, or a slave tool, for temporarily securing the wheel cover to the wheel until the closed-cell foamed adhesive sufficiently cures.

It is still another object to obtain a significant reduction in initial and permanent cure times of a bead of adhesive applied between a wheel cover and wheel, and therefore achieve faster manufacturing throughput and a commensurate reduction in work-in-process inventory.

It is yet another object to foam a bead of closed-cell foamed adhesive in place as it is selectively deposited to provide more complete volumetric filling of a gap between a wheel cover and a wheel in order to achieve greater surface area coverage between a wheel cover and a wheel to eliminate the need to apply multiple beads of unfoamed adhesive to achieve the same or similar amount of surface area coverage. Accordingly, the present invention provides more complete volumetric filling of the adhesive between a wheel and wheel cover to minimize the hollow-sounding characteristics of bead adhesive type wheel assemblies of the prior art.

It is still a further object to apply a bead of closed-cell foamed adhesive between a wheel cover and a wheel that does not readily break down at high temperatures.

It is a further object to apply a foamed adhesive between a wheel cover and wheel such that the closed-cell foamed adhesive covers a greater surface area and volume compared to a non-foamed adhesive of the same weight, thereby enabling a reduction in weight by requiring less material to achieve greater fill and coverage.

It is yet a further object to provide a foamed sealant applied between a wheel cover and wheel that is less expensive than structural foam adhesive and more effective than unfoamed adhesive to achieve an optimum balance in adhesive fill and coverage characteristics and manufacturing process advantages.

It is an additional object to provide a foamed adhesive to a wheel assembly to enable a reduction in cost and weight of the wheel assembly yet provide flexibility regarding aesthetics while maintaining a proper wheel balance and other engineering characteristics.

It is an added object to provide a foamed adhesive to a wheel assembly to enable a selective amount of closed-cell foamed adhesive to be used, such that various manufacturing, performance, and quality related characteristics of the wheel assembly can be tailored by selective placement of the closed-cell foamed adhesive between the wheel cover and wheel.

These objects and other features, aspects, and advantages of this invention will be more apparent after a reading of the following detailed description, appended claims, and accompanying drawings.

DETAILED DESCRIPTION OF THE PREFERRED EMBODIMENT

Referring now in detail to the Figures, there is shown in FIGS. 1, 2, 3, 7, and 8 a prior art wheel assembly 10P that is constructed in accordance with a prior art method of bonding a wheel cover 16 to a wheel 11 using an unfoamed adhesive 30P. Such an unfoamed adhesive 30P is typically a high viscosity thixotropic bead of adhesive. In contrast, FIGS. 4, 5, 6, 9, and 10 illustrate a wheel assembly 10, or unassembled components thereof, according to the present invention that is constructed in accordance with a method of the present invention wherein the wheel cover 16 is bonded to the wheel 11 using a bead of high viscosity thixotropic closed-cell foamed adhesive 30 that is injected or impregnated with an inert gas as it is selectively deposited to the wheel 11 or wheel cover 16.

Figure 4:
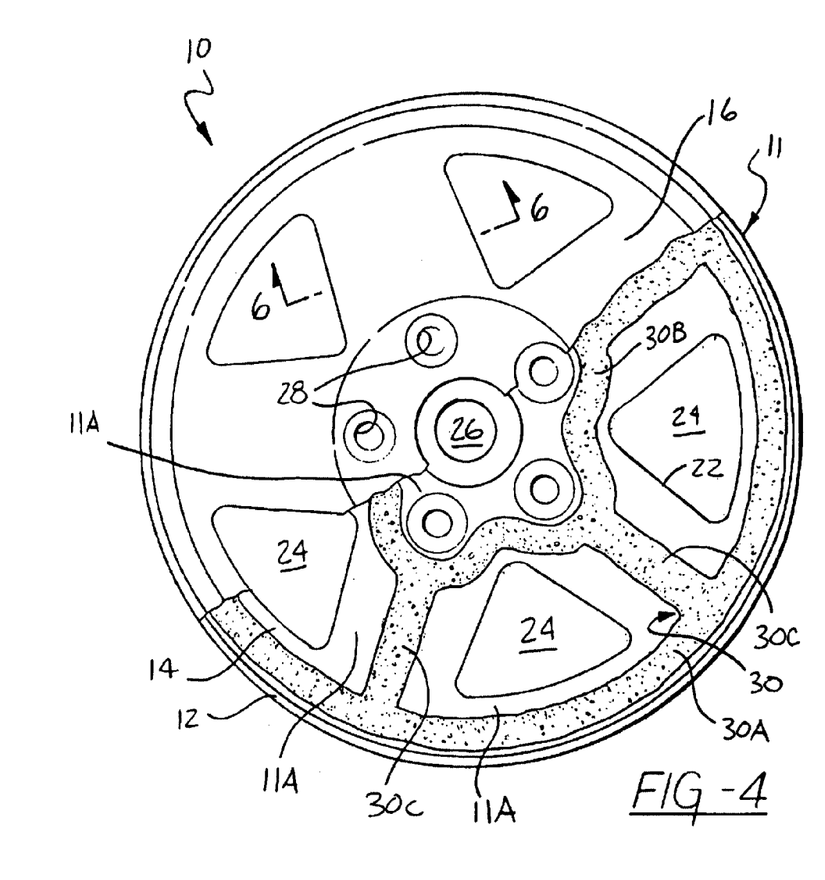
FIG. 4 is a partially broken out plan view of unassembled wheel components according to the present invention showing a wheel cover spaced axially away from an underlying wheel that has a closed-cell foamed adhesive pattern applied thereto according to the preferred embodiment of the present invention.

Referring to FIG. 4, the wheel assembly 10 generally includes the wheel 11, the wheel cover 16, and a selectively applied bead pattern of the closed-cell foamed adhesive 30. The wheel 11 includes an annular rim flange 12 and a wheel spider, web, or disc 14 that together define an outboard surface 11A of the wheel 11. The wheel 11 includes any type of well-known wheel construction and is not limited to either a cast aluminum wheel or a fabricated steel wheel. Other materials and methods of construction are contemplated including titanium, magnesium, plastic, composites, or combinations thereof. The annular rim flange 12 circumscribes the disc 14, and may be welded to the perimeter of the disc 14, as in the case of a standard steel wheel, or integrally cast with the disc 14, as in the case of a cast aluminum wheel. Located in the center of the disc 14 is a hub opening 26 which generally serves to permit mounting of the wheel 11 on a wheel balancing or tire mounting machine to mount and/or balance a tire (not shown). Additional features on the outboard surface 11A of the wheel 11 include lug bolt openings 28 for receiving lug bolts (not shown) that fasten the wheel 11 to the wheel hub, turbine openings 24 that serve to stylize the wheel 11 or in some applications provide the function of cooling the brakes (not shown), and spokes 22 radially extending between, and defining, the turbine openings 24.

An overlay, cladding, or wheel cover 16 is shown as a solid panel of a uniform thickness, preferably of a high-impact, high temperature resistance plastic such as a modified PC/ABS material. As shown in FIGS. 4 and 6, the wheel cover 16 is axially spaced from the wheel 11 in a position just prior to assembly with the wheel 11 and just prior to contact with the closed-cell foamed adhesive 30. Ultimately, the wheel cover 16 is to be secured directly to the outboard surface 11A of the wheel 11 as will be discussed below in relation to FIGS. 5, 9, and 10.

As shown in FIG. 6, an inboard surface 16A of the wheel cover 16 is configured to face the outboard surface 11A of the wheel 11 when assembled. An outboard surface 16B of the wheel cover 16 is therefore visible when the wheel cover 16 is assembled to the wheel 11. As is well known in the art, the outboard surface 16B of the wheel cover 16 is adapted to receive a decorative bright metal layer that is electrochemically plated thereto so as to contribute a bright appearance which adds an aesthetically pleasing appearance to the wheel 11. A painted surface is also contemplated for some applications. Furthermore, the wheel cover 16 is preferably formed from a high impact plastic having an appropriate treatment layer on the outboard surface 16B thereof such that the wheel cover 16 and its metal plating are highly resistant to the adverse thermal environment of the wheel 11. Alternatively, other high impact and high temperature resistant plastic wheel covers are contemplated. As a result, the metal-plated outboard surface 16B of the wheel cover 16 can be allowed to conform to the contours of the outboard surface 11A of the wheel 11, while resisting delamination of the metal plating due to heat or other environmental elements.

As also shown in FIGS. 4 and 6, the wheel 11 further includes the high strength, permanent, closed-cell foamed adhesive 30 that is impregnated with an inert gas and selectively deposited as a bead between the wheel cover 16 and the wheel 11 for the purpose of permanently securing the wheel cover 16 to the wheel 11. As used herein, the term sealant is synonymous with adhesive since sealants and adhesives often overlap in adhesion and sealing characteristics. Also, the term bead means a projecting band of material continuously deposited on a surface in a single pass, like a weld bead on sheet metal.

Compositions of adhesives that are contemplated for this invention include polymers of a thermoplastic or thermoset nature. Because of their high temperature capability and desirable mechanical properties, silicone and polyurethane sealants/adhesives are preferred for the closed-cell foamed adhesive 30. High strength sealants that are suitable for use with the closed-cell foamed adhesive 30 are well known and commercially available. While suitable sealants for use as the closed-cell foamed adhesive 30 must have excellent mechanical properties, such sealants are generally characterized by relatively slow cure rates that can require several hours before the sealant is sufficiently set to absorb severe impacts or harsh handling without detrimental effects thereto. Preferably, a thermosetting material is used such as a moisture-cured silicone RTV paste like General Electric RTV 5249, or Novagard 400-118. It is foreseeable, however, that other high strength as well as high temperature resistive sealants or adhesives could be employed with satisfactory results. The present invention is not to be limited to the use of only these materials, as any reasonably equivalent adhesives or sealants can be used.

The term gas-impregnated means that the closed-cell foamed adhesive 30 is not foamed prior to application, such as in a holding tank, and the closed-cell foamed adhesive 30 is not foamed after application, as in the case of a slowly rising foam. Rather, the liquid phase adhesive is foamed as it is dispensed from a dispensing device and applied to the wheel 11, wheel cover 16, or both so as to create the closed-cell foamed adhesive 30, as will be described in detail below.

Furthermore, the term foam is very broad and requires some clear definition as applied to the present invention. The term foam is often synonymous with expanded plastic, foamed plastic, or plastic foam, which generally require some type of chemical reaction between two chemical parts of adhesive. As used herein, however, foam is defined in the following manner: a two-phase system where a gas phase is dispersed within a liquid phase, specifically wherein a mass of fine bubbles of the gas phase is formed in the liquid phase. As applied here, the adhesive alone is taken to mean the liquid phase, and an inert gas such as $CO_2$ is taken to mean the gas phase. Preferably, however, due to its relatively low cost $N_2$ is homogeneously mixed with the liquid phase adhesive, but the present invention is not to be limited thereto. Thus, the closed-cell foamed adhesive 30 of the present invention is reasonably construed as a bead of foamed, cellular polymeric material, but is in contrast to blown structural foam such as that taught by Derleth. It is contemplated that the closed-cell foamed adhesive 30 can be produced by any polymer foaming process, but it is preferred that a gas injection or mechanical agitation process is used to mix the gas with the closed-cell adhesive 30 as will be described in greater detail below.

As shown in FIG. 4, the closed-cell foamed adhesive 30 is selectively deposited as an outer bead 30A near the perimeter of the wheel 11, an inner bead 30B around the lug bolt openings 28, and a plurality of spoke beads 30C therebetween so as to prevent the ingress of water and dirt between the wheel cover 16 and the wheel 11 after the wheel cover 16 is attached to the wheel 11. The closed-cell foamed adhesive 30 serves as the permanent, primary, and preferably the only element for securing the wheel cover 16 to the wheel 11. For example, further testing will be aimed at determining whether it is necessary to use two or more different sealant materials, one being a temporary securing mechanism, and the other being a permanent securing mechanism. It is currently believed that the significantly reduced curing time possible with the present invention will enable a manufacturer to reduce reliance on or completely eliminate any temporary securing mechanism for the wheel cover 16.

Figure 1:
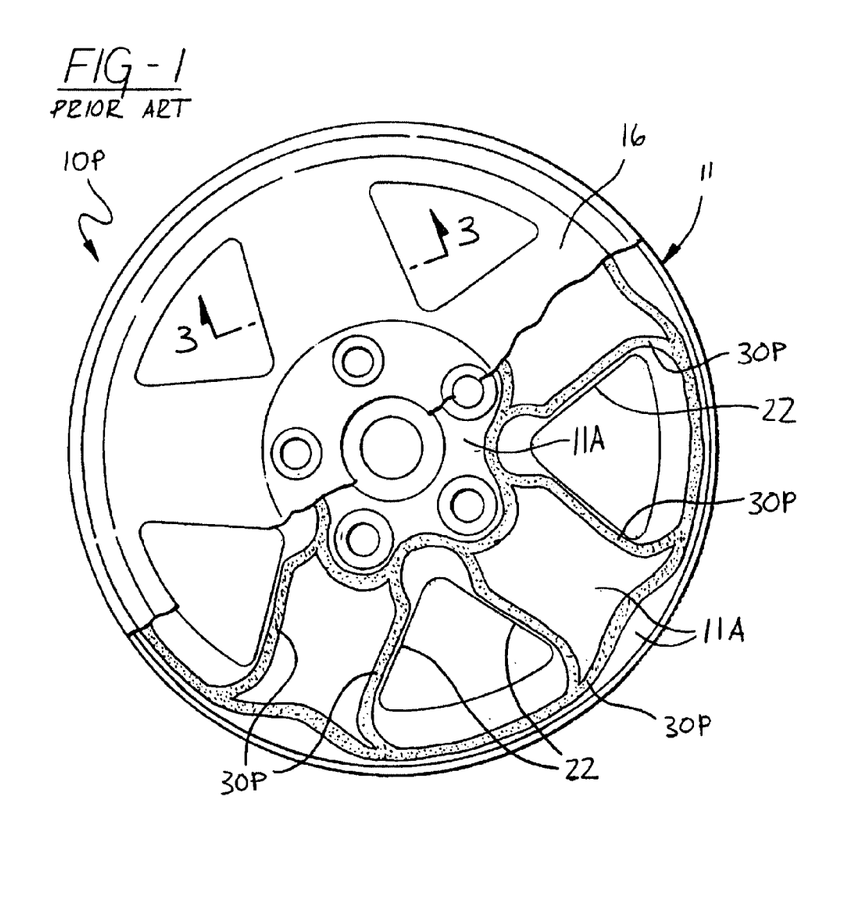
FIG. 1 is a partially broken out plan view of unassembled prior art wheel components showing a wheel cover spaced axially away from an underlying wheel that has a prior art adhesive pattern applied thereto.

Additionally, the use of the closed-cell foamed adhesive 30 is contrary to the unfoamed bead of adhesive and structural foam adhesive in the prior art such as Derleth, Beam, and Chase. Prior art adhesive bead application, such as that depicted in FIG. 1, is relatively thin and narrow compared to that of the present invention. Therefore, as disclosed in Chase '213, multiple separated lines of adhesive are often used to obtain more complete coverage of the adhesive and to help reduce the cure time of the adhesive by establishing moisture laden air pockets between the lines of adhesive, but is cost intensive. In contrast, where the Chase '213 reference requires redundant lines of adhesive for optimal curing and coverage, the present invention adhesive bead application requires only one bead of closed-cell foamed adhesive 30 for increased amounts of coverage and substantially reduced cure time, while using less liquid phase material.

Figure 3:
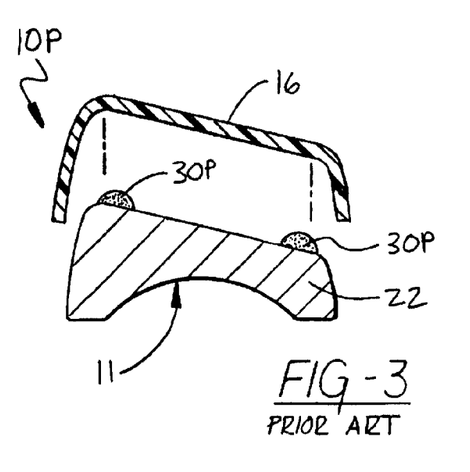
FIG. 3 is a cross-section of the unassembled prior art wheel components of FIG. 1 taken along line 3—3 thereof.

FIGS. 3 and 6 illustrate cross-sectional views of the wheel components of the prior art and present invention, respectively. As shown, beads of unfoamed adhesive 30P and closed-cell foamed adhesive 30 are applied to the outboard surface 11A of the wheel 11 along a spoke 22. Alternatively, the beads of unfoamed adhesive 30P and closed-cell foamed adhesive 30 can be and often are applied to the inboard surface 16A of the wheel cover 16 as opposed to the outboard surface 11A of the wheel 11. The wheel cover 16 is shown spaced axially away from the wheel 11 in a pre-assembly position before the unfoamed adhesive 30P and closed-cell foamed adhesive 30 is sandwiched therebetween. As can be seen in FIG. 6, the closed-cell foamed adhesive 30 of the present invention includes tiny inert gas bubbles entrapped therein. In contrast, the unfoamed adhesive 30P of the prior art, as shown in FIG. 3, is dense with no substantial air or gas entrapment therein. While each bead of unfoamed adhesive 30P and closed-cell foamed adhesive 30 of FIGS. 3 and 6 are shown to have the same weight and volume of liquid phase adhesive material, the present invention bead of closed-cell foamed adhesive 30 of FIG. 6, including the entrapped gas phase, is approximately double the overall volume and cross-sectional area to provide a wider, taller bead, compared to that of the prior art.

Figure 9:
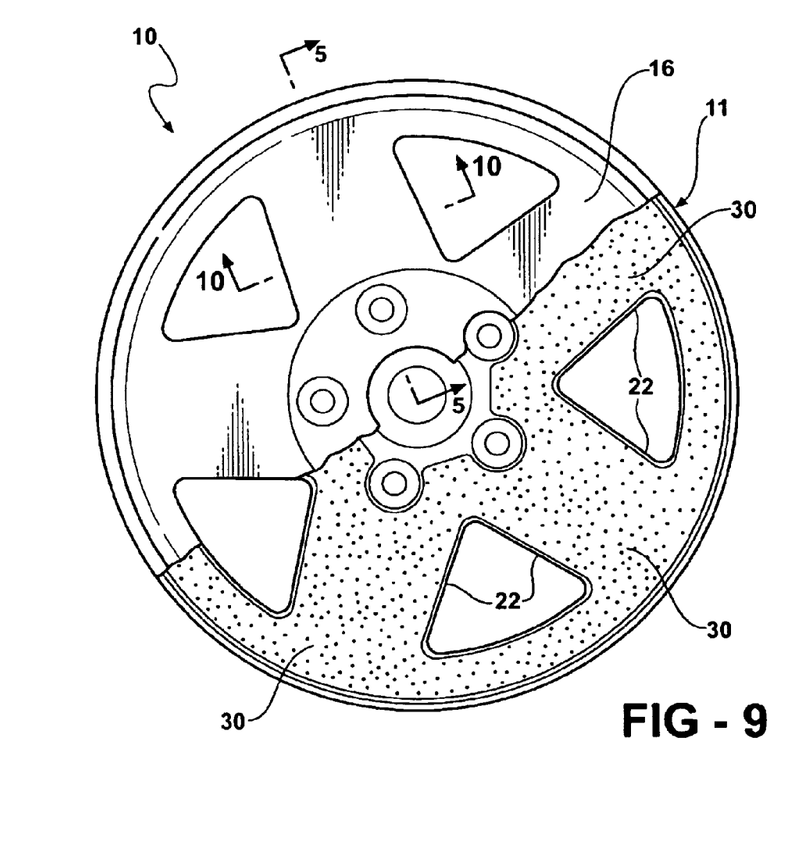
FIG. 9 is a partially broken out plan view of a wheel assembly according to the present invention showing the wheel cover of FIG. 4 adhesively secured to the wheel of FIG. 4, wherein the closed-cell foamed adhesive pattern of FIG. 4 has been spread and smeared between the wheel cover and the wheel during the assembly process.

FIG. 9 illustrates the present invention with the wheel cover 16 fully assembled to the underlying wheel 11. As the wheel cover 16 is pressed onto the wheel 11, as is well known in the art, the inboard surface 16A of the wheel cover 16 makes contact with the bead of closed-cell foamed adhesive 30 and thereby spreads or smears the bead of closed-cell foamed adhesive 30 between the wheel cover 16 and the wheel 11 to cover a significantly greater surface area than prior art applications. Accordingly, the entrapped gas phase is substantially compressed thereby enabling the surrounding adhesive to spread over a substantial surface area. As the closed-cell foamed adhesive 30 spreads, some of the entrapped gas is released to atmosphere and some remains entrapped within the closed-cell foamed adhesive 30.

As can be seen in the Figures, the closed-cell foamed adhesive 30 spreads from the relatively wide bead shape of FIG. 4 to the much wider collapsed shape of FIG. 9. The bead width doubles or triples after assembly and varies dependent upon size of area to be filled. Typically, as-applied beads of the present invention are approximately 0.6" to 1.2" in width and are spread out to 1.8" to 3.0" upon assembly, for a significant increase of approximately 250%–300%. In contrast, the unfoamed adhesive 30P of FIG. 1 goes from a relatively narrow bead shape to the slightly wider, slightly smeared shape of FIG. 7. Typically as-applied unfoamed beads are approximately 0.40" to 0.95" in width and are spread out to about 0.50" to 1.05" after assembly, for a slight increase of only about 10%–25%. It is significant to note that the bead of unfoamed adhesive 30P of the prior art is still identifiable as a bead even after the wheel cover 16 has been assembled and compressed to the wheel 11. In contrast, after assembly and compression of the wheel cover 16 to the wheel 11, the closed-cell foamed adhesive 30 is unidentifable as having been an applied bead, and instead appears as a wide spread of material. As it appears to an observer, the wide spread of closed-cell foamed adhesive 30 appears as though it could have been sprayed on or applied in some other fashion, which is not at all the appearance of the prior art unfoamed adhesive 30P. Thus, the greater surface area coverage that the closed-cell foamed adhesive 30 spreads over a larger surface area after assembly of the wheel cover 16 to the wheel 11 and therefore helps to significantly deaden the hollow sound of wheels having wheel covers applied thereto.

Figure 10:
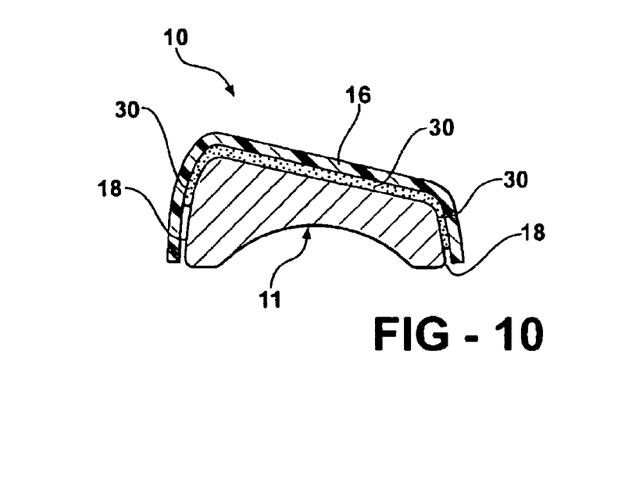
FIG. 10 is a cross-section of the wheel assembly of FIG. 9 taken along line 10—10 thereof.

FIG. 10 illustrates the cross-sectional view of one of the spokes 22 of the wheel assembly 10, wherein the bead of closed-cell foamed adhesive 30 has been spread and slightly smeared within the gap 18 between the wheel 11 and wheel cover 16. As one can readily see between FIGS. 10 and 8, the closed-cell foamed adhesive 30 of the present invention occupies a significantly greater portion of the gap 18 compared to the unfoamed adhesive 30P of the prior art. The closed-cell foamed adhesive 30 occupies 75%–95% of the gap 18 compared to only 30%–40% with the unfoamed adhesive 30P of the prior art. Moreover, the closed-cell foamed adhesive 30 can be deposited such that only a portion of the gap 18 between the wheel cover 16 and wheel 11 is filled.

Figure 11:
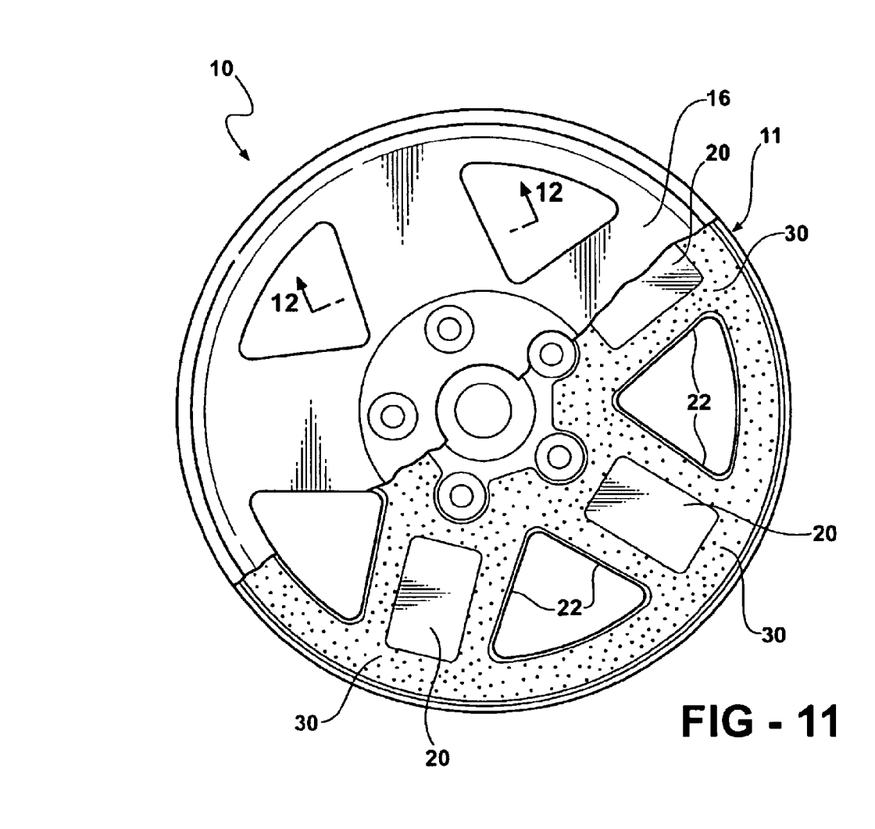
FIG. 11 is a partially broken out plan view of a wheel assembly according to the present invention showing the closed-cell foamed adhesive has been applied between the cover and the wheel so as to leave voids therebetween.
Figure 12:
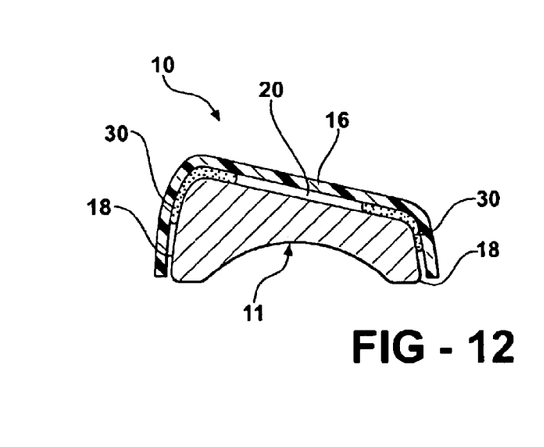
FIG. 12 is a cross-section of the wheel assembly of FIG. 10 taken along line 12—12 thereof.

For example, the closed-cell foamed adhesive 30 can be applied only to the extent necessary to exclude moisture and dirt from the gap 18 between the wheel cover 16 and wheel 11. It is advisable that, on average in any given location, the closed-cell foamed adhesive 30 fill about 60%–95% of the gap 18, and is preferable to fill about 75%–90% thereof. The resulting voids 20 as shown in FIGS. 11 and 12 between the wheel 11 and wheel cover 16 can serve as a reservoir for air or moisture laden air for air-cured and moisture-cured sealants, thereby further improving the cure rate of the closed-cell foamed adhesive 30. The closed-cell foamed adhesive 30 can also be deposited in order to manage thermal conduction between the wheel 11 and wheel cover 16, tailor the acoustical characteristics of the wheel assembly 10, accommodate tolerance variations between the wheel 11 and the wheel cover 16, and affect the balance of the wheel 11.

Figure 2:
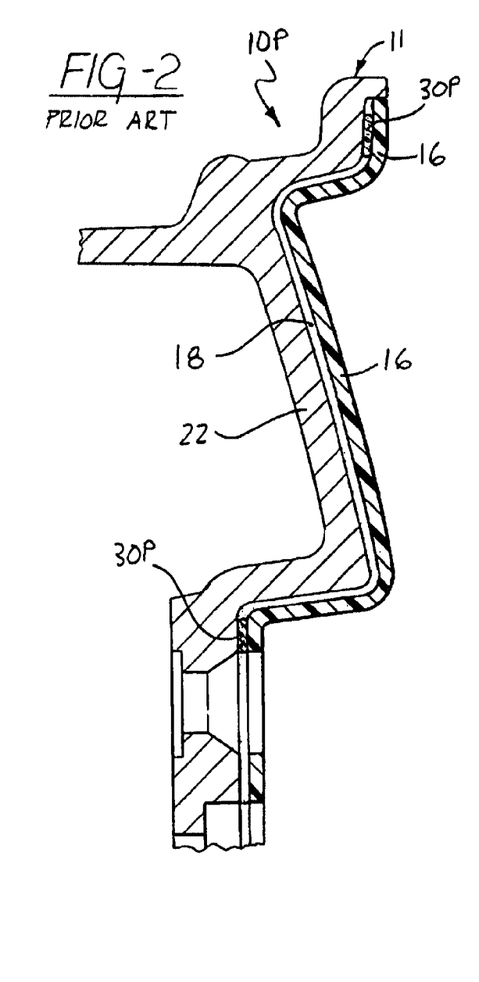
FIG. 2 is a cross-section of the assembled prior art wheel assembly of FIG. 7 taken along line 2—2 thereof.
Figure 5:
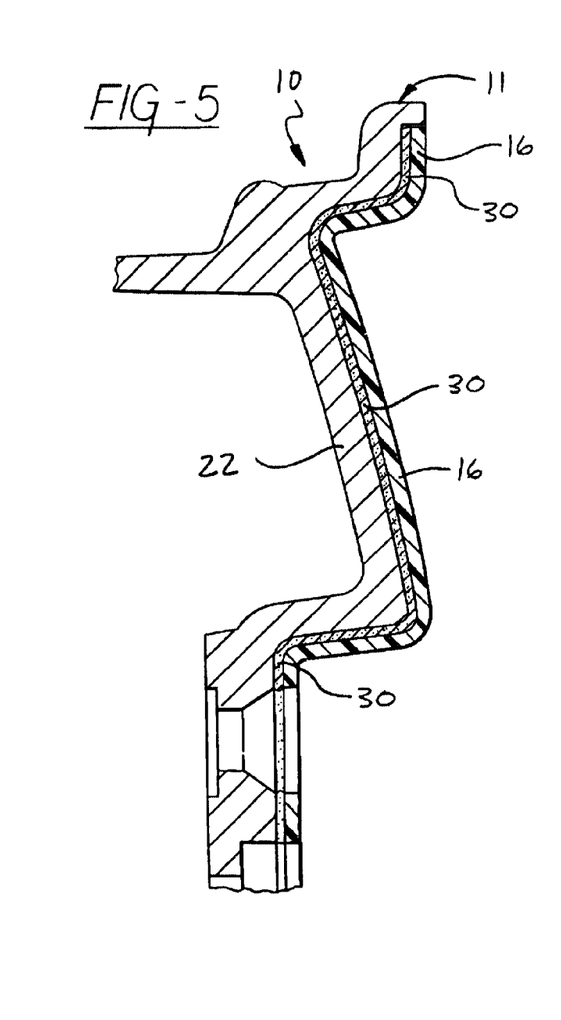
FIG. 5 is a cross-section of the assembled present invention wheel assembly of FIG. 9 taken along line 5—5 thereof.
Figure 6:
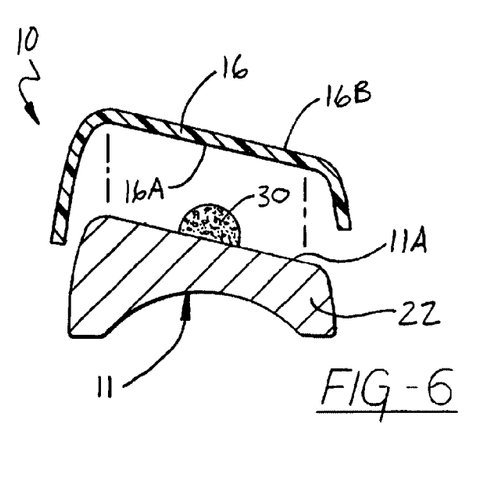
FIG. 6 is a cross-section of the unassembled wheel components of the present invention of FIG. 4 taken along line 6—6 thereof showing gas bubbles entrapped within an adhesive.
Figure 7:
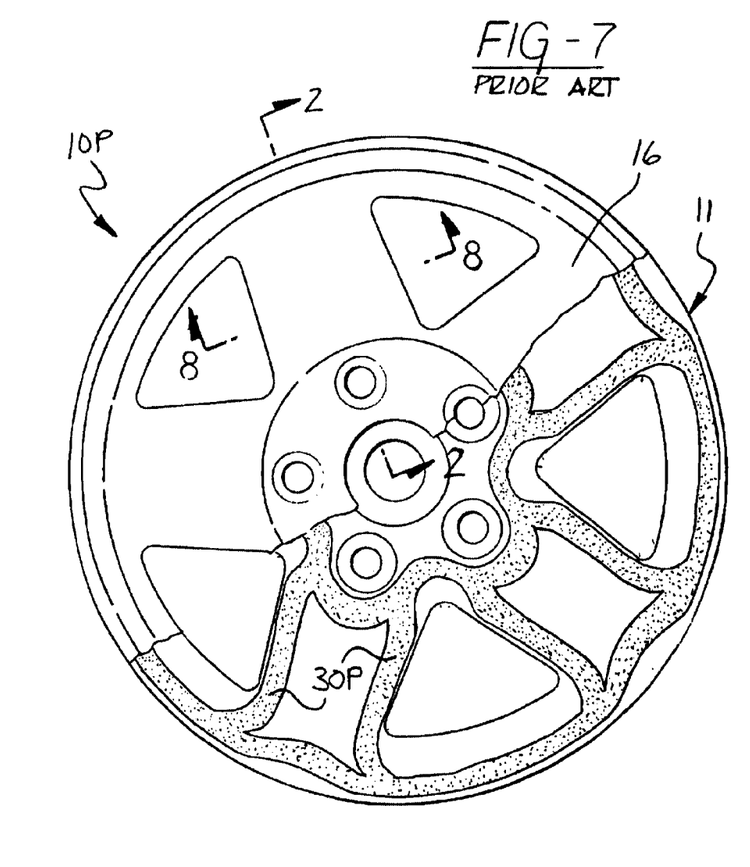
FIG. 7 is a partially broken out plan view of a prior art wheel assembly showing the wheel cover of FIG. 1 adhesively secured to the underlying wheel of FIG. 1, wherein the prior art adhesive pattern of FIG. 1 has been smeared between the wheel cover and wheel.
Figure 8:
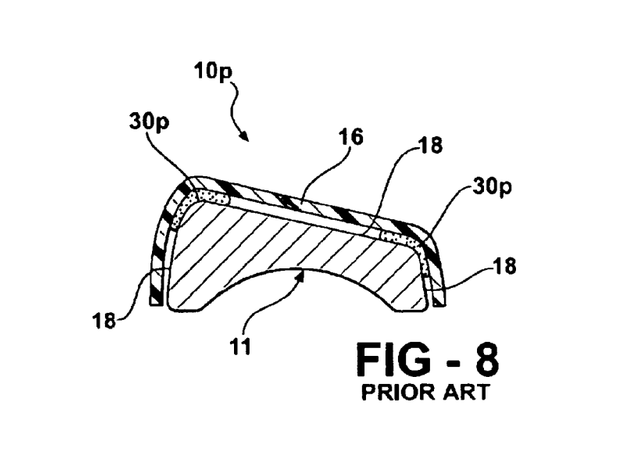
FIG. 8 is a cross-section of the prior art wheel assembly of FIG. 7 taken along line 8—8 thereof.

The difference between the prior art and present invention is further illustrated by FIGS. 2 and 5. FIG. 2 shows the prior art wheel assembly 10P having the noticeable gap 18 between the wheel cover 16 and wheel 11, especially over the spoke 22. A thin bead of unfoamed adhesive 30P is shown proximate the periphery of the wheel 11 and near a central portion of the wheel 11. In contrast, FIG. 5 shows the present invention wheel assembly 10 having a more complete fill of closed-cell foamed adhesive 30 between the wheel cover 16 and wheel 11 with no gap whatsoever, even over the spoke 22.

In view of the above, it can be seen that the embodiments illustrated in FIGS. 4, 5, 6, and 9–12 make possible several combinations of wheel covers and wheels, as well as, novel methods for assembling the wheel cover 16 to the wheel 11. The general method involves assembling the wheel cover 16 to the wheel 11 to form the wheel assembly 10. First there must be provided the wheel 11 having the outboard surface 11A thereon, and the wheel cover 16 having the inboard surface 16A thereon that faces the outboard surface 11A of the wheel 11.

Next, a dispensing device (not shown) must be provided that is used for supplying a liquid phase adhesive, supplying a pressurized inert gas, and mixing the pressurized inert gas with the liquid phase adhesive to produce a homogeneous gas/adhesive mixture wherein the pressurized inert gas remains intermixed in solution within the liquid phase adhesive. It is preferred to use a commercially available dispensing device or system, such as the trademarked Foam-Mix® system produced by the Nordson Corporation of Westlake, Ohio. Using the FoamMix® system, the inert gas is pressurized and forced into solution with the liquid phase adhesive during a gear pump mixing step.

Further, the homogeneous gas/adhesive mixture is then dispensed from the dispensing device to apply the bead of foamed-in-place adhesive to either one, or both, of the inboard and outboard surfaces 16A and 11A of the wheel cover 16 and the wheel 11. As the homogeneous gas/adhesive mixture is dispensed under pressure from a nozzle of the dispensing device onto the wheel cover 16 or wheel 11 at atmospheric pressure conditions, the pressure within the homogeneous gas/adhesive mixture is relieved, thereby allowing the gas phase to expand within the adhesive and thereby foam the sealant to establish entrapped bubbles therein to provide a fine closed-cell foamed adhesive 30 composition. Essentially, this step is not completely unlike dispensing whipped cream or shaving cream from a brand new canister to achieve a light and fluffy bead of material, instead of a dense and runny bead of material as when such a canister substantially loses its charge of gas, except that surface tension of the high viscosity adhesive entraps the expanded bubbles of gas.

Moreover, the wheel cover 16 and wheel 11 are assembled to one another such that the inboard surface 16A of the wheel cover 16 faces the outboard surface 11A of the wheel 11, whereupon the gap 18 is defined therebetween. Accordingly, the bead of closed-cell foamed adhesive 30 gets compressed between the wheel 11 and the wheel cover 16 to collapse and smear the paste over and around the gas cells in the closed-cell foamed adhesive 30 therebetween, thus releasing some or all of the gas therein to form an adhesive bond between the wheel cover 16 and wheel 11, wherein the closed-cell foamed adhesive 30 occupies a predetermined volume of the gap 18.

Finally, the now spread closed-cell foamed adhesive 30 is allowed to cure, thereby permanently bonding the wheel cover 16 to the wheel 11 to form the wheel assembly 10. Through experimentation with various sealants it has been found that by managing the amount of gas entrapped within a given amount of high viscosity liquid paste adhesive, it is possible to optimize the cure time. Therefore, it is advisable to use a gas concentration of 35%–60%, and preferable to use approximately a 40% gas concentration. To be able to use the gas entrapped with the liquid phase adhesive to so significantly affect the curing time of the sealant was a completely unexpected advantageous result. In experimentation it was found that the present invention was 100% cured within 4 to 5 days, compared to 10 to 21 days using the prior art unfoamed adhesive 30P patterns. Additionally, the initial cure time, wherein the sealant is cured to about 25%, was reduced from at least 24 hours with prior art unfoamed adhesives 30P to less than 16 hours with the present invention. Surprisingly, however, only a slight loss in push off force results from using the bubble laden closed-cell foamed adhesive 30. Specifically, prior art push-off values range from 4,500 to 6,000 lbs-force, whereas the present invention push-off values range from 4,000 to 5,500 lbs-force. Such a slight reduction in bond strength is considered well worth the advantages and savings achieved with the present invention.

Advantageously, eliminating the necessity to use redundant lines of adhesive to fill the gap 18 between the wheel cover 16 and wheel 11 enables the closed-cell foamed adhesive 30 to be selectively deposited to achieve any one or more refinements to the overall manufacturability, performance, and consumer-perceived quality of the wheel assembly 10. As such, selective deposition of the closed-cell foamed adhesive 30 in accordance with this invention can be employed to achieve increased surface coverage per unit of weight of liquid phase adhesive and to optimize cure times under many manufacturing conditions. Furthermore, the present invention enables increased and more efficient volumetric fill of bead adhesive to provide superior sound-deadening between the wheel cover 16 and the wheel 11. In summary, the present invention yields significant economic improvements in the fabrication of vehicle wheel assemblies.

While the present invention has been described in terms of a preferred embodiment, it is apparent that other forms could be adopted by one skilled in the art. Accordingly, the scope of the present invention is to be limited only by the following claims.

What is claimed is:

1. The method of assembling a wheel cover to a wheel to form a wheel assembly, said method comprising the steps of:
    providing a wheel having an outboard surface thereon;
    providing a wheel cover having an inboard surface thereon adapted to face said outboard surface of said wheel;
    dispensing a bead of high density closed-cell foamed adhesive at least partially spread to at least one of said inboard surface of said wheel cover, and said outboard surface of said wheel, said bead of high density closed-cell adhesive comprisig a high density liquid phase adhesive and a gas phase in the form of a plurality of gas bubbles entrapped within said liquid phase adhesive; and
    assembling said wheel cover and said wheel together such that said inboard surface of said wheel cover faces said outboard surface of said wheel, wherein a gap is defined between said inboard surface of said wheel cover and said outboard surface of said wheel, said bead of high density closed-cell foamed adhesive being compressed to define said gap between said wheel cover and said wheel and to partially spread said bead of high density closed-cell foamed adhesive such that said plurality of gas bubbles have been at least partially released to the atmosphere as a result of said high density bead of closed-cell adhesive being at least partially spread.

2. The method of assembling a wheel cover to a wheel as claimed in claim 1, further comprising the step of allowing said bead of high density closed-cell foamed adhesive to cure after assembly, thereby permanently bonding said wheel cover to said wheel to form said wheel assembly.

3. The method of assembling a wheel cover to a wheel as claimed in claim 1, wherein said dispensing and assembling steps result in said compressed bead of high density closed-cell foamed adhesive covering a greater surface area per weight unit than unfoamed adhesives of the prior art and curing more rapidly than said unfoamed adhesive of the prior art to reduce manufacturing process time.

4. The method of assembling a wheel cover to a wheel as claimed in claim 1, wherein said dispensing step comprises said high density closed-cell foamed adhesive being comprised of RTV material.

5. The method of assembling a wheel cover to a wheel as claimed in claim 1, wherein said assembling step comprises establishing at least one void between said inboard surface of said wheel cover and said outboard surface of said wheel.

6. The method of assembling a wheel cover to a wheel as claimed in claim 1, wherein said step of dispensing comprises not applying said bead of high density closed-cell foamed adhesive in multiple spaced apart lines.

7. A method of assembling a wheel cover to a wheel to form a wheel assembly, said method comprising the steps of:
    providing a wheel having an outboard surface thereon;
    providing a wheel cover having an inboard surface thereon adapted to face said outboard surface of said wheel;
    forming a homogeneous gas and liquid adhesive mixture by mixing a liquid adhesive and a gas;
    dispensing said homogeneous gas and liquid adhesive mixture to produce a bead of high density closed-cell foamed adhesive on at least one of said inboard surface of said wheel cover and said outboard surface of said wheel, said bead of high density closed-cell adhesive comprising a high density liquid phase adhesive and a gas phase in the form of a plurality of gas bubbles entrapped within said liquid phase adhesive;
    assembling said wheel cover together with said wheel such that said inboard surface of said wheel cover faces said outboard surface of said wheel, wherein a gap is defined between said inboard surface of said wheel cover and said outboard surface of said wheel, said bead of high density closed-cell foamed adhesive being compressed to define said gap between said wheel cover and said wheel and to partially spread said bead of high density closed-cell foamed adhesive, whereby said bead of high density closed-cell foamed adhesive occupies a predetermined volume of said gap; and
    allowing said bead of high density closed-cell foamed adhesive to cure, thereby permanently bonding said wheel cover to said wheel to form said wheel assembly.

8. The method of assembling a wheel cover to a wheel as claimed in claim 7, wherein said dispensing and assembling steps result in said high density closed-cell foamed adhesive covering a greater surface area per weight unit than unfoamed adhesive of the prior art and curing more rapidly than said unfoamed adhesives of the prior art to reduce manufacturing process time.

9. The method of assembling a wheel cover to a wheel as claimed in claim 7, wherein said dispensing step comprises said high density closed-cell foamed adhesive being comprised of silicone RTV material.

10. The method of assembling a wheel cover to a wheel as claimed in claim 7, wherein said assembling step comprises establishing at least one void between said inboard surface of said wheel cover and said outboard surface of said wheel.

11. The method of assembling a wheel cover to a wheel as claimed in claim 7, wherein said step of dispensing comprises not applying said bead of high density closed-cell foamed adhesive in multiple spaced apart lines.

12. A method of assembling a wheel cover to a wheel to form a wheel assembly, said method comprising the steps of:

providing a wheel having an outboard surface thereon;

providing a wheel cover having an inboard surface thereon adapted to face said outboard surface of said wheel;

providing a dispensing device, said dispensing device comprising the steps of:

supplying a high density closed-cell foamed adhesive;

supplying a pressurized inert gas; and mixing said pressurized inert gas with said high density closed-cell foamed adhesive to produce a homogeneous gas/adhesive mixture, said pressurized inert gas remaining intermixed in solution within said high density closed-cell foamed adhesive;

dispensing a bead of said homogeneous gas/adhesive mixture from said dispensing device to apply a bead of high density foamed-in-place closed-cell adhesive to at least one of said inboard surface of said wheel cover and said outboard surface of said wheel, said bead of high density closed-cell adhesive comprising a high density liquid phase and a gas phase in the form of a plurality of gas bubbles entrapped within said liquid phase, said gas expanding within said adhesive to foam said homogeneous gas/adhesive mixture upon introduction of said homogeneous gas/adhesive mixture to atmospheric pressure during said dispensing step;

assembling said wheel cover and said wheel together such that said inboard surface of aid wheel cover faces said outboard surface of said wheel, wherein a gap is defined between said inboard surface of said wheel cover and said outboard surface of said wheel, said bead of high density foamed-in-place closed-cell adhesive being compressed to define said gap between said wheel cover and said wheel and to at least partially spread said high density bead of foamed-in-place closed-cell adhesive therebetween such that said plurality of gas bubbles have been at least partially released to the atmosphere as a result of said bead of high density closed-cell adhesive being at least partially spread, whereby said at least partially spread adhesive occupies a predetermined volume of said gap; and allowing said bead of at least partially spread adhesive to cure, thereby permanently bonding said wheel cover to said wheel to form said wheel assembly;

such that said at least partially spread adhesive covers a greater surface area per weight unit than unfoamed adhesives of the prior art and cures more rapidly than unfoamed adhesives of the prior art to reduce manufacturing process time.

13. The method of assembling a wheel cover to a wheel as claimed in claim 12, wherein said dispensing step comprises said bead of high density foamed-in-place closed-cell adhesive being comprised of silicone RTV material.

14. The method of assembling a wheel cover to a wheel as claimed claim 12, wherein said assembling step comprises establishing at least one void between said inboard surface of said wheel cover and said outboard surface of said wheel.

15. The method of assembling a wheel cover to a wheel as claimed in claim 12, wherein said step of dispensing comprises not applying said bead of high density foamed-in-place closed-cell adhesive in multiple spaced apart lines.

* * * * *

UNITED STATES PATENT AND TRADEMARK OFFICE
CERTIFICATE OF CORRECTION

PATENT NO.         : 6,998,001 B2
APPLICATION NO. : 10/760835
DATED                  : February 14, 2006
INVENTOR(S)        : James A. Woelfel It is certified that error appears in the above-identified patent and that said Letters Patent is hereby corrected as shown below:

In Column 3, line 44, kindly delete "applique" and insert --applique'--.

In Column 3, line 47, kindly delete "applique" and insert --applique'--

In Column 4, line 2, kindly delete "hot melt" and insert --hot-melt--.

In Column 4, line 8, kindly delete "hot melt" and insert --hot-melt--.

In Column 4, line 19, kindly delete "hot melt" and insert --hot-melt--.

In Column 4, line 21, kindly delete "hot melt" and insert --hot-melt--.

In Column 4, line 23, kindly delete "slow curing" and insert --slow-curing--.

In Column 4, line 26, after "separated" kindly insert --,--.

In Column 5, line 44, after "in" kindly insert --the full surface adhesive applications of--.

In Column 6, line 6, after "adhesives" kindly insert --in the selective application of Chase--.

In Column 6, line 30, kindly delete "hot melt" and insert --hot-melt--.

In Column 11, line 26, after "strength" kindly insert --,--.

In Column 11, line 26, after "as well as" kindly insert --,--.

UNITED STATES PATENT AND TRADEMARK OFFICE
CERTIFICATE OF CORRECTION

PATENT NO.       : 6,998,001 B2
APPLICATION NO. : 10/760835
DATED            : February 14, 2006
INVENTOR(S)      : James A. Woelfel It is certified that error appears in the above-identified patent and that said Letters Patent is hereby corrected as shown below:

In Column 18, line 2, kindly delete "aid" and insert --said--.

In Column 18, line 21, after "than" kindly insert --said--.

Signed and Sealed this

Fifteenth Day of August, 2006

JON W. DUDAS
*Director of the United States Patent and Trademark Office*